Dec. 17, 1935.　　　A. C. DURDIN, JR　　　2,024,986
APPARATUS FOR AND METHOD OF SEWAGE TREATMENT
Original Filed May 5, 1932　　2 Sheets-Sheet 1

Inventor:
Augustus C. Durdin Jr.
By Charles O. Shrrey
his Atty.

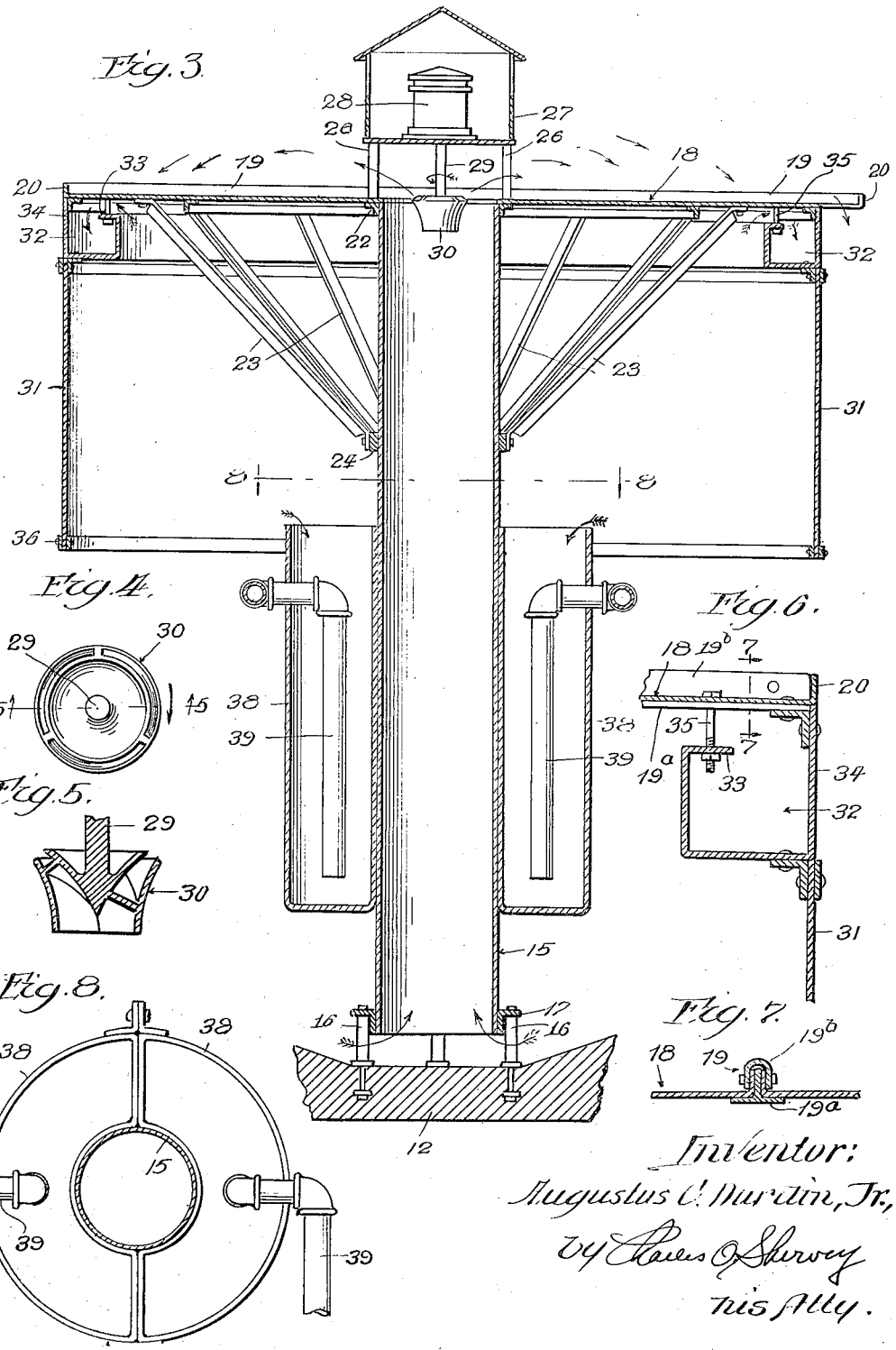

Patented Dec. 17, 1935

2,024,986

UNITED STATES PATENT OFFICE 2,024,986

APPARATUS FOR AND METHOD OF SEWAGE TREATMENT

Augustus C. Durdin, Jr., Chicago, Ill., assignor to Chicago Pump Company, Chicago, Ill., a corporation of Illinois Application May 5, 1932, Serial No. 609,407
Renewed February 27, 1934

22 Claims. (Cl. 210—8)

This invention relates to apparatus for and method of treatment of sewage and other liquids, and its principal object is to provide simple and efficient means whereby they may be more thoroughly aerated than heretofore. Another object is to provide means for more effectively removing impurities from sewage and other impure liquids.

In one aspect the invention has reference more particularly to apparatus for and method of treating sewage in accordance with the activated sludge process, which as is well understood, is a process in which aerobic bacteria are employed to break down the impurities in the sewage. As is well known, it is necessary to supply the bacteria with oxygen in order that they may thrive.

In accordance with the present invention, the sewage is passed through a tank wherein the sewage is subjected to the biological action of aerobic bacteria, is circulated in the tank, withdrawn from the bottom of the tank and discharged upon a baffle such as a platform above the surface of the liquid by an aerating device which breaks up the liquid into a dense spray, which comes in contact with the air (oxygen) and when falling upon the liquid on the platform, it beats air into the liquid. The liquid flows along the platform and falls therefrom in the form of cascades, and sinks into the liquid, carrying air with it and again beating air into the liquid, so that by the time the sprayed liquid reaches the body of liquid contained in the tank it has absorbed a maximum amount of air (oxygen). Inasmuch as the liquid is withdrawn from the bottom of the tank, there is a continuous circulation in the tank towards the bottom thereof, so that the aerobic bacteria contained in the sewage are supplied with oxygen not only at the surface of the liquid, but throughout the body thereof.

The invention contemplates means for removing the accumulated sludge and decanting the purified liquid, together with means for continuously discharging the purified liquid from the tank.

The invention consists, therefore, in an apparatus embodying means for spraying the sewage upon a baffle from which the liquid discharges through the air and into a tank and is circulated there through and returned from the bottom of the tank to the baffle in the form of a spray.

The invention further consists in a tank for receiving the sewage and having a centrally disposed quiescent zone from which the sludge is removed and the purified liquid is decanted.

The invention further consists in the method of treatment of sewage which consists in moving sewage, subjected to the biological action of aerobic bacteria, from the bottom of a tank to the top thereof and spraying it upon a baffle above the surface of the liquid, discharging the sewage from the baffle, through the air and upon the surface of the liquid contained in the tank, circulating it therein, and again moving the liquid from the bottom of the tank and spraying it upon the baffle, the sewage thus treated flowing to a quiescent zone wherein the sludge is removed therefrom and the purified liquid is decanted therefrom.

The invention further consists in the several novel features of construction, arrangement and combination of parts hereinafter fully set forth and claimed.

The invention is clearly illustrated in the drawings accompanying this specification in which—

Fig. 3 is a detail vertical cross section taken on the line 3—3 of Fig. 2;

Fig. 4 is a detail plan of an impeller or aerating device employed in the apparatus;

Fig. 5 is a detail cross section taken on the line 5—5 of Fig. 4;

Fig. 6 is a detail fragmental vertical axial section taken on the line 6—6 of Fig. 1;

Fig. 7 is a detail vertical cross section taken on the line 7—7 of Fig. 6; and

Fig. 8 is a detail horizontal cross section taken on the line 8—8 of Fig. 3.

Figure 1:
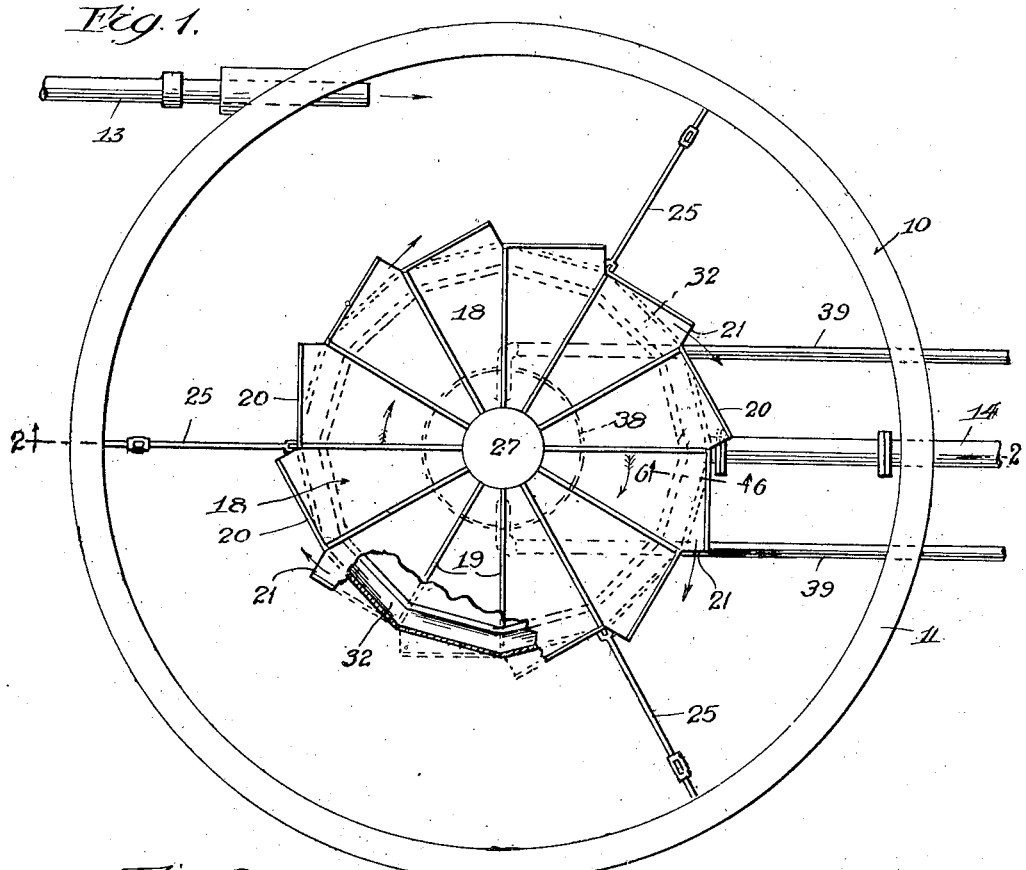
Fig. 1 is a plan, partly broken out, of an apparatus embodying a simple form of the present invention.
Figure 2:
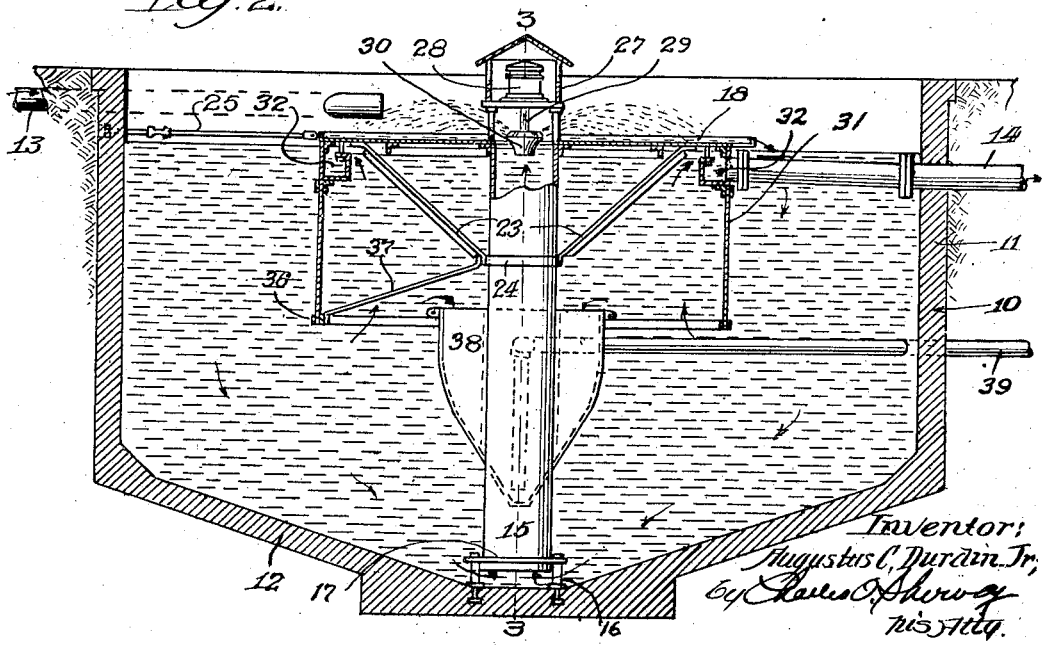
Fig. 2 is a vertical cross section, partly in elevation, the section being taken on the line 2—2 of Fig. 1.

Referring to said drawings, which illustrate a simple embodiment of the present invention, the reference character 10 designates a tank preferably having a cylindrical vertical wall 11 and a tapering bottom wall 12. The tank may be constructed of any suitable material, but as a preference it is made of concrete. As influent conduit 13 for conducting the sewage to the tank enters the circular wall of the tank near the top thereof in a tangential direction and discharges the sewage into the tank in a tangential direction, thereby causing the circular movement of the liquid in the tank. An effluent conduit 14 leads from the middle portion of the tank, as will be hereinafter explained, and discharges the purified liquid from the tank.

Supported centrally upon the bottom wall of the tank is an upright conduit 15, here shown in the form of a pipe which extends to a place at or slightly above the normal level of the liquid contained in the tank, the lower end of the pipe being supported above the bottom wall of the tank, whereby the liquid may enter said pipe and flow to the upper end thereof. Conveniently, the pipe may be supported by a number of posts 16 embedded in the bottom wall and a ring 17 carried by the posts and fastened to the lower end of the pipe 15.

Supported as upon the pipe 15 is a baffle or other element having a fixed or hard surface and here shown in the form of a platform 18 which is located above the surface of the liqud and is divided by ribs 19 into a series of shallow pans, the edges of which have upturned flanges 20 forming low walls at the margins of the pans. Desirably the frame of the platform may be formed of radially extending T-bars 19ª which carry the pans. Inverted U-bars 19ᵇ straddle the adjacent flanges of the pans and T-bars and cover the crevices therebetween. One corner of each pan projects somewhat beyond the corner of an adjacent pan, as is seen at 21, and at this place the wall 20 is omitted, thereby leaving an opening in the flange of each pan through which the liquid may discharge therefrom upon the liquid contained in the outer area of the tank.

The platform 18 may be supported upon the pipe 15 in any desirable manner, and, as illustrated, an angle ring 22 surrounds the upper end of the pipe 15 and is riveted or otherwise secured thereto and to the T-bars of the platform. Brace rods 23 bolted or otherwise secured to a ring 24 fastened to the pipe 15 are secured to the T-bars of the platform near the margin thereof and serve to support the outer portion of the platform, and together with tie rods 25 fastened to the edge of the platform and to the vertical wall of the tank serve to rigidly hold the platform in place.

Mounted upon the upper end of the pipe 15 as by posts 26 is a cage 27 in which is supported an electric motor 28 upon the shaft 29 of which is mounted an impeller or aerating device 30 usually formed with vanes or blades designed to throw the liquid upward and outward through the air. The impeller is partially submerged in the liquid contained in the pipe 15 and operates to withdraw the liquid therefrom and throw it upon the platform in the form of a widely spreading spray.

Any suitable impeller or aerating device may be employed which operates to throw the liquid upon the platform in the form of a spray. The revolving impeller throws the spray through the air and it falls upon the liquid contained upon the platform, from which the liquid discharges in a tangential direction and falls into the liquid contained in the tank.

Supported below the platform is a vertical endless wall 31 which projects down into the body of liquid for a considerable distance and separates the incoming impure liquid from the outgoing purified liquid and provides a quiescent zone or settling chamber from which the purified liquid is decanted. At the top of the endless wall 31 is an endless channel 32 having a weir 33 upon its inner upper side over which the purified liquid decants into the channel 32.

The outer wall 34 of the channel 32 is rigidly fastened to the underside of the platform 18 and the weir is adjustably secured thereto as by bolts and nuts 35, thereby providing means whereby the weir may be adjusted vertically so as to make it level in order that the liquid may evenly flow over the same at all places. The effluent conduit 14 leads from the channel 32 and discharges the purified liquid therefrom. The endless wall 31 may, of course, be composed of any suitable material, and, as a preference, it is composed of rubber reinforced with fabric. The upper end of the endless wall 31 is secured to the underside of the bottom wall of the channel 32 and to its lower edge is secured a ring 36 which is connected to the ring 24 by one or more braces 37 so as to stay the lower end of the endless wall.

Supported upon the upright pipe 15 are sludge collectors 38, the upper ends of which are preferably disposed somewhat above the lower end of the endless wall 31 and the lower ends of which converge on each side of the upright pipe. From the lower end of each sludge collector extends a draw off pipe 39 which leads out through the wall of the tank and is provided with a valve (not shown) whereby the sludge which collects in the sludge collector may be drained off by gravity by opening the valve, or if necessity requires, a pump may be connected to each pipe 39 for discharging the sludge from the sludge collector. Usually the sludge is withdrawn from the sludge collectors alternately although this is not necessary.

I will now proceed to describe the method of treating sewage in accordance with the present invention. The sewage is introduced into the tank in a tangential direction thereby setting up a circular motion to the sewage already contained in the tank in which aerobic bacteria are present. The impeller or aerator is rotated thereby withdrawing liquid from the upright pipe and spraying it through the air and upon the platform. The particles of the spray being separated and coming into contact with the air absorb air (oxygen) and on falling upon the platform, they beat the air into the liquid.

The liquid flows over the platform and discharges through the openings in the pans in tangential directions in the form of cascades and falls into the liquid contained in the outer area of the tank around the endless wall that separates the quiescent zone from the circulation zone. The liquid flowing from the platform sinks into the body of liquid in the tank and continues on in a spiral direction, thereby carrying with it the absorbed air (oxygen), and thus supplying the aerobic bacteria with the necessary oxygen to cause them to thrive. The aerobic bacteria break down the impurities contained in the liquid thus forming sludge and the mass circulates toward the bottom of the tank from which it rises in the pipe to be again sprayed upon the platform.

Purified water decants over the weir into the endless channel and discharges through the effluent discharge pipe and the sludge being slightly heavier than water does not rise as fast as does the water, consequently the water becomes purified befoıe decanting over the weir. The sludge settles in the quiescent zone within the endless wall, and some of it is carried down with the liquid and is mixed with the incoming sewage and again circulated through the upright pipe over the platform and into the liquid in the tank. The excess sludge which settles in the quiescent zone spills into the sludge collectors and is periodically or continuously discharged therefrom through the draw off pipes.

It is to be observed that the liquid thrown through the air from the conduit, absorbs air from above and below the thrown liquid, and in being dashed upon the platform, the globules are broken up into finer drops, thereby exposing other surfaces to the air and increasing the amount of air absorption. Again when discharging from the platform and falling through the air, other surfaces of the liquid are exposed and the liquid again absorbs air before entering the sewage in the tank.

I claim as new, and desire to secure by Letters Patent:

1. Apparatus for the treatment of sewage comprising in combination a tank, an upright conduit open at the top and bottom, means for circulating the sewage in the presence of aerobic bacteria from one area of the tank towards the bottom thereof and up through said conduit and throwing the sewage from the top of the conduit, a platform upon which said sewage is dashed and from which all of the sewage which is dashed upon it discharges upon the sewage contained in said area of the tank, means providing a quiescent zone separated from said area of the tank, a channel at the top of the quiescent zone into which purified liquid decants, and a sludge collector below said quiescent zone into which sludge settles from said quiescent zone.

2. Apparatus for the treatment of sewage comprising in combination a tank, an upright conduit therein open at the top and bottom, means for circulating the sewage in the presence of aerobic bacteria from the outer area of the tank towards the bottom thereof and up through said conduit and throwing it from the top of said conduit, a platform located above the level of the sewage and upon which said sewage is dashed from the top of said conduit and from which it is discharged upon the sewage contained in the outer area of the tank, means providing a quiescent zone, a channel at the top of said quiescent zone into which the purified liquid decants, and a sludge collector below said quiescent zone into which sludge settles from said quiescent zone.

3. Apparatus for the treatment of sewage comprising in combination a circular tank, a centrally disposed upright conduit therein open at the top and bottom, an aerating device at the top of said conduit operating to draw sewage from said conduit and discharge it therefrom in the form of a spray, a platform upon which the sprayed sewage falls and from which it discharges upon the sewage contained in the outer area of the tank, means providing a centrally located quiescent zone separated from the outer area of the tank, a channel at the top of said quiescent zone into which purified liquid decants, and a sludge collector in which sludge flows from the quiescent zone.

4. Apparatus for the treatment of sewage comprising in combination a tank in which sewage is treated, means for circulating the sewage therein in the presence of aerobic bacteria from the outer area of the tank toward the bottom thereof and thence to the top thereof and discharging the sewage in the form of a spray, a platform located above the normal level of the sewage in the tank upon which the sewage is discharged and from which the sprayed sewage discharges upon the sewage contained in the outer area of the tank, a wall providing a quiescent zone within the tank, a channel above said wall into which purified liquid decants from said quiescent zone, and a sludge collector below said quiescent zone into which sludge flows from the quiescent zone.

5. Apparatus for the treatment of sewage comprising in combination a tank, an upright conduit therein open at the top and bottom, an aerating device located at the top of said conduit and acting to withdraw liquid and discharge it therefrom in the form of a spray, a platform located above the normal level of the sewage contained in the tank, upon which said aerating device sprays sewage and from which the sprayed sewage discharges upon the sewage contained in the outer area of the tank and circulates towards the bottom thereof, there being a quiescent zone around said conduit separated from the outer area of the tank, a decanting channel at the top of said quiescent zone, a sludge collector below said quiescent zone into which sludge flows therefrom, and means for discharging sludge from said sludge collector.

6. Apparatus for the treatment of sewage comprising in combination a tank, an upright conduit therein open at the top and bottom, an aerating device at the top of said conduit through which the sewage is discharged in the form of a spray, a platform upon which said sprayed sewage falls and from which it discharges upon the sewage contained in the outer area of the tank, said sewage being circulated in the presence of aerobic bacteria from said outer area towards the bottom of the tank and thence up through the conduit, an endless wall below the platform providing a quiescent zone thereunder into which the sewage rises and from which the sludge resulting from the action of the aerobic bacteria on the sewage settles, a decanting channel at the top of the said endless wall into which purified liquid decants, and means for collecting the sludge which settles from the liquid.

7. Apparatus for the treatment of sewage comprising in combination a tank, an upright conduit therein open at the top and bottom, an aerating device at the top of the conduit through which the sewage is discharged therefrom in the form of a spray, a platform upon which said sprayed sewage falls, said platform having a marginal low wall provided with discharge openings through which the sprayed sewage discharges upon the sewage contained in the outer area of the tank, the sewage being circulated in the presence of aerobic bacteria from said outer area towards the bottom of the tank and thence up through the conduit, a wall below the platform providing a quiescent zone thereunder into which the sewage rises and from which the sludge resulting from the action of the aerobic bacteria upon the sewage settles, a decanting channel at the top of said wall into which purified liquid decants, and means for collecting the sludge which settles from the liquid.

8. In apparatus for the treatment of sewage, the combination of an aerating device adapted to discharge sewage in the form of a spray, a platform upon which the sprayed sewage falls, said platform having radially extending low walls and tangentially directed marginal walls dividing the platform into individual pans, there being discharge openings in each pan through which sewage sprayed upon the platform may discharge therefrom in tangential directions.

9. In apparatus for the treatment of sewage, the combination of a circular tank, an upright conduit centrally supported therein and open at the top and bottom, a spraying device mounted at the top of said conduit, a platform supported by the conduit and adapted to receive the sprayed sewage and discharge the same into the outer area of the tank, an endless wall below the platform providing a quiescent zone, a plurality of sludge collectors surrounding said conduit and disposed principally below said quiescent zone, and draw off pipes, one for each sludge collector.

10. The method of treating sewage which consists in, first, introducing the sewage into a tank, second, circulating the sewage in the presence of aerobic bacteria from the outer area of the tank towards the bottom thereof and up through a conduit, third, withdrawing the sewage from the top of the conduit, throwing it through the air and dashing it upon a platform, fourth, discharging the sewage from the platform upon the sewage contained in the outer area of the tank, fifth, passing the sewage upward into a quiescent zone and therewith permitting sludge which results from the biological action of the aerobic bacteria on the sewage to settle into a sludge collector, sixth, decanting the purified liquid and withdrawing the decanted liquid.

11. The method of treating sewage which consists in, first, introducing the sewage into a tank in a tangential direction, second, circulating the sewage in the presence of aerobic bacteria from the outer area of the tank towards the bottom thereof and up through a conduit, third, withdrawing the sewage from the top of the conduit and throwing it through the air and dashing it upon a platform in the form of a swirling spray, fourth, discharging the sewage from the platform in a tangential direction upon the sewage contained in the outer area of the tank, fifth, passing the sewage upward through a quiescent zone and therewith permitting sludge which results from the biological action of the aerobic bacteria on the sewage to settle into a sludge collector, sixth, decanting the purified liquid and withdrawing the decanted liquid.

12. The method of treating sewage which consists in first, introducing the sewage into a tank, second, circulating the sewage in the presence of aerobic bacteria from the tank towards the bottom thereof and up through a conduit, third, throwing the sewage from the upper end of the conduit, through the air and dashing it against a fixed surface, fourth, discharging the sewage from said fixed surface upon the sewage contained in the tank, fifth, passing the sewage upward into a quiescent zone and therewith permitting sludge which results from the biological action of the aerobic bacteria on the sewage to settle, sixth, recirculating some of the sludge and collecting and removing excess sludge, and seventh, decanting the purified liquid and withdrawing the decanted liquid.

13. Apparatus for aerating liquids comprising in combination a tank for containing the liquid to be treated, a conduit therein through which the liquid rises and from which the liquid is discharged through the air, a baffle located above and spaced from the liquid in the tank, said baffle having a fixed surface against which the discharged liquid is dashed, and from which it discharges through the air, and into the body of liquid contained in the tank, liquid circulating means for circulating the liquid through the tank and discharging it from the conduit, and a wall below the baffle providing a settling chamber.

14. Apparatus for the treatment of sewage comprising a tank for containing the sewage to be treated, a conduit from which sewage is discharged through the air, a baffle located above and spaced from the sewage in the tank, said baffle having a fixed surface against which the discharged liquid is dashed, and from which it is discharged through the air and into the sewage contained in the tank, and sewage circulating means for circulating the sewage through the tank in the presence of aerobic bacteria and discharging the sewage from the conduit through the air and dashing it upon said baffle, and a wall below the baffle providing a settling chamber therebelow.

15. Apparatus for the treatment of sewage comprising in combination, a tank in which the sewage is circulated in the presence of aerobic bacteria, a settling chamber having an inlet at its lower end through which sewage enters the settling chamber and rises therein, and through which sludge settles out, a conduit having an inlet at its lower end located below the settling chamber, means for discharging the sewage from the upper end of the conduit and emptying it into the circulating sewage in the tank, whereby the circulating sewage and sludge which settles from the settling chamber are returned through the conduit and discharged upon the circulating sewage in the tank, an influent conduit leading to the tank, and an effluent conduit leading from the settling chamber.

16. Apparatus for the treatment of sewage comprising in combination a tank, means for circulating the sewage therein in the presence of aerobic bacteria from the outer area of the tank toward the bottom thereof and thence to the top thereof and discharging it into the outer area of the tank, a continuous wall providing a quiescent settling zone surrounded by the outer area of the tank and having an inlet at the bottom leading from said outer area, and having a discharge outlet at the top, whereby the treated sewage may enter said quiescent zone from below, the liquid may rise therein and discharge therefrom at its top.

17. Apparatus for the treatment of sewage comprising in combination a circular tank, means for circulating the sewage therein in the presence of aerobic bacteria from the outer area of the tank toward the bottom thereof and thence to the top thereof and discharging it into the outer area of the tank, a circular wall in the tank, providing a quiescent zone, surrounded by the outer area of the tank and having an inlet at the bottom leading from the outer area of the tank, and having a discharge outlet at its top, whereby the treated sewage may enter the quiescent zone from below, the liquid may rise therein and discharge therefrom at its top.

18. Apparatus for the treatment of sewage comprising in combination a tank, an open ended upright conduit therein through which sewage may enter from the tank and rise therein, an aerator at the top of said conduit for discharging sewage therefrom, a baffle upon which the sewage is discharged from the aerator and from which the sewage discharges into the outer area of the tank and a continuous wall below the baffle, providing a quiescent zone directly above the open lower end of said conduit, there being an inlet passage to the lower end of the quiescent zone and a discharge opening at its upper end, whereby treated sewage in the outer area of the tank may enter the quiescent zone at its bottom, rise therein and discharge at its top, and whereby sludge settles out from said quiescent zone and is recirculated through said upright conduit.

19. Apparatus for the treatment of sewage comprising in combination, a tank having a sewage influent conduit, an upright conduit leading from the bottom of the tank, a continuous wall spaced from and surrounding said upright conduit to provide a settling chamber, around the conduit, there being a passage at the bottom of said wall between the main area of the tank and the settling chamber, whereby sewage may enter and rise in said settling chamber, and whereby sludge may settle out from the sewage in the settling chamber and enter the conduit, and means at the top of the conduit for discharging sewage from the conduit and returning it to the sewage in the main area of the tank.

20. Apparatus for the treatment of sewage comprising in combination, a tank having a sewage influent conduit, an upright open ended conduit leading from the bottom of the tank, a continuous wall spaced from and surrounding said upright conduit to provide a settling chamber, around the conduit, closed at its upper end, there being a passage at the bottom of said wall between the main area of the tank and the settling chamber, whereby sewage may enter and rise in said settling chamber, and whereby sludge may settle out from the sewage in the settling chamber and enter the conduit, and means at the top of the conduit for discharging sewage from the conduit and returning it to the sewage in the main area of the tank.

21. Apparatus for the treatment of sewage comprising in combination a tank, means for circulating the sewage therein from the outer area of the tank to the bottom thereof and thence to the top thereof and discharging it into the outer area of the tank, and a continuous wall providing a quiescent settling zone surrounded by the outer area of the tank and having an inlet leading from the outer area, whereby sewage may enter the settling zone from the outer area of the tank, said settling chamber having an effluent discharge opening at its upper end whereby the effluent discharges from the settling chamber.

22. In apparatus for the treatment of liquid, the combination of an aerating tank, a platform therein upon which the liquid is discharged and from which it discharges into the tank, and walls extending up from the platform adjacent the edge thereof, said walls being circumferentially disposed about the centre of the platform with the outer extremities thereof disposed farther from the centre of the platform than opposite inner portions of the next adjacent walls, and there being discharge openings between the outer extremities of the walls and inner portions of the next adjacent walls through which the liquid is discharged from the platform in tangential directions.

AUGUSTUS C. DURDIN, Jr.